June 17, 1930.  R. E. C. DELEVOYE  1,765,133
GEAR BOX
Filed Feb. 14, 1929  3 Sheets-Sheet 1

Inventor
Robert E. C. Delevoye
by Wilkinson & Hiusta
Attorneys.

June 17, 1930.  R. E. C. DELEVOYE  1,765,133
GEAR BOX
Filed Feb. 14, 1929   3 Sheets-Sheet 2

Inventor
Robert E. C. Delevoye
by Wilkinson & Giusta
Attorneys.

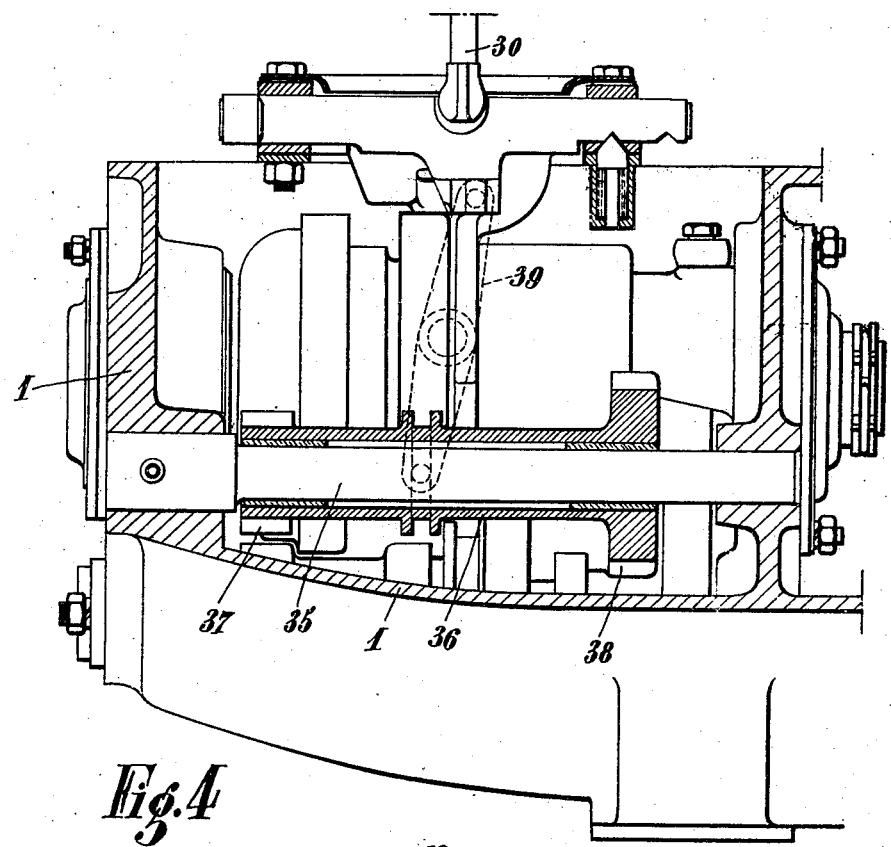
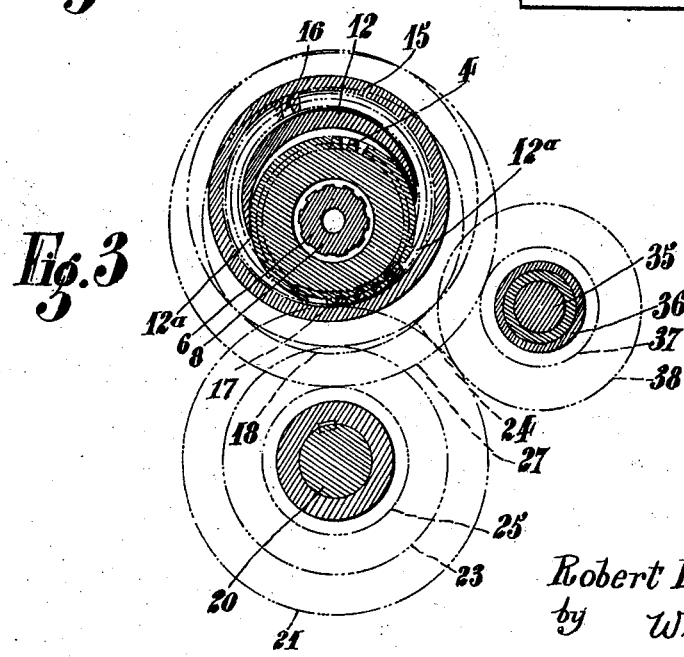

Patented June 17, 1930

1,765,133

UNITED STATES PATENT OFFICE

ROBERT EMILE CHARLES DELEVOYE, OF PARIS, FRANCE, ASSIGNOR TO SOCIETE ANONYME DES ANCIENS ETABLISSEMENTS HOTCHKISS & CIE., OF ST.-DENIS, SEINE, FRANCE, A JOINT-STOCK COMPANY OF FRANCE

GEAR BOX

Application filed February 14, 1929, Serial No. 339,869, and in France January 14, 1929.

The present invention relates to improvements in gear boxes, for example, for motor vehicles, said improvements being more particularly applicable, however, to gear boxes of the kind which include, in addition to other parts, a double set of internally toothed gears. As is well known, this arrangement, which enables one of the speeds to be obtained solely by means of internally toothed gears, is very advantageous on account of the silence and strength of the transmission. Its use, however, entails making the gear boxes comparatively large and heavy. With the present invention, on the contrary, it is possible to obtain an internally toothed gear box of this character, of reduced bulk and weight and yet of sturdy construction. The gear box comprises, in the usual manner, a driving and a driven shaft, arranged preferably in alignment, countershafts parallel to the above mentioned shafts, sliding gears and pinions corresponding to each of said shafts, and it is essentially characterized by the fact that it includes a hollow fixed drum located eccentrically relative to the driving and driven shafts which may rotate within said drum on which the sliding gear, meshing with said driving and driven shafts, is supported.

According to an advantageous form of construction, the above mentioned drum, which is fixed at one end to the corresponding flange of the gear box casing, is supported at its other end by the driven shaft or its extension. A bearing in which said shaft can rotate, is provided, to this effect, in the end of the drum. This form of construction is particularly adapted to the case in which the driven shaft, or its extension, can rotate at one end in a corresponding bore formed in the driving shaft which thus acts as a journal therefor.

The drum includes a cut away portion whereby the driving pinion, which is fashioned as usual at the end of the driving shaft, can engage with the internal toothing of the sliding gear mounted on the drum and with the auxiliary pinion or pinions.

According to the invention, the sleeve for obtaining direct drive (which can slide in the usual manner on the driven shaft) is displaced through the medium of the sliding gear mounted on the drum, said sliding gear thus acting as a controlling member in addition to its function of sliding gear.

The invention is likewise concerned with a gear change assembly, which, for obtaining direct drive and three speeds, comprises a driving shaft connected to a driving pinion, a driven shaft in alignment with the driving shaft and connected to an internally toothed plate, an eccentric fixed drum on which is mounted a first sliding gear having an internal toothing constantly meshing with the toothing of the driving pinion and an external toothing capable of engaging with the internal toothing of the plate of the driven shaft, a sleeve for obtaining direct drive which can slide on the driven shaft and couple said shaft to the driving shaft by interlocking with corresponding means provided at the end of the driving shaft, a countershaft parallel to the driving and driven shafts and whereon is mounted a pinion constantly engaging with the driving pinion, and a second sliding gear having two external toothings capable of engaging respectively with a second external toothing on the first sliding gear and with an external toothing on the plate of the driven shaft, it being possible moreover to connect said second sliding gear to the aforementioned pinion carried by said countershaft, means being provided for controlling the aforementioned first and second sliding gears as well as the sleeve securing direct drive and for maintaining said members in the several positions into which they may be brought.

Said gear box may be completed by a reverse speed device comprising a second countershaft on which is mounted a gear train of two pinions adapted to be brought simultaneously and respectively into engagement with the pinion of the first countershaft and with the external toothing of the plate of the driven shaft.

Other characteristics and peculiarities of the invention will become apparent from the subsequent description with reference to the accompanying drawings in which:

Fig. 3 is another cross-section on the line III—III of Fig. I and in which only the gears have been illustrated.

Fig. 4 is a longitudinal section on the line IV—IV of Fig. 2, that is to say, on the axis of the reverse speed countershaft.

Figure 1:
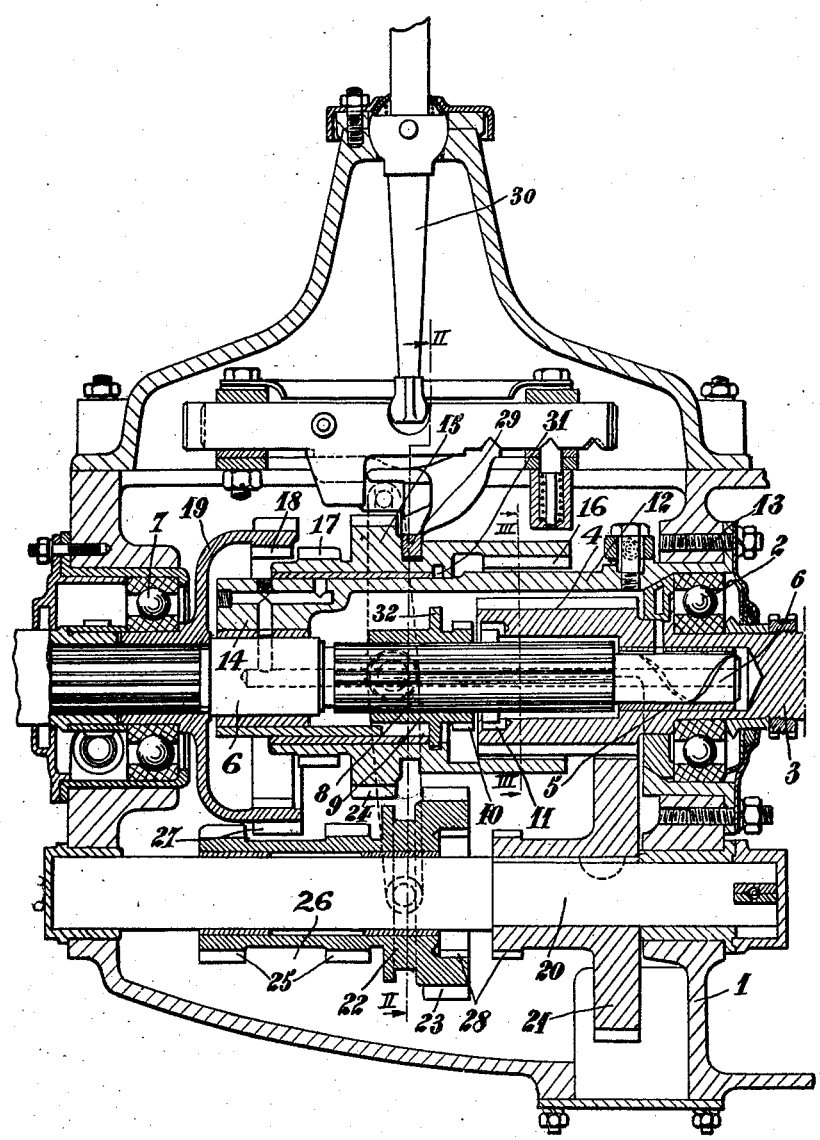
Fig. 1 is a longitudinal sectional elevation (on the axis of the driving and driven shafts) of a gear box in accordance with the invention.

The gear box illustrated in the drawings essentially comprises a casing 1 which may be of any suitable form and assembled in any suitable manner on the chassis of the motor vehicle to which the gear box illustrated is supposed to be adapted.

The driving shaft 3 connected to the engine is supported in one of the lateral cheeks of the casing 1, for example, in ball-bearings 2. Said shaft 3, which carries a driving pinion 4, has formed in its end a cylindrical bore 5 in which is engaged the corresponding end of the driven shaft 6 (or its extension) coaxial with the driving shaft 3. The driven shaft 6 is likewise supported, for example by means of ball bearings 7, in the other side cheek of the casing 1. On said driven shaft 6 is formed a fluted portion 8 over which may slide a sleeve 9 rotating with the shaft 6 and having a toothing, or dogs 10 which may engage in a toothing or in corresponding recesses 11 formed in the end of the driving pinion 4. With this arrangement, direct drive may be obtained in a well known manner.

According to the invention, the gear box includes a drum 12 rigidly fixed, as by screws 13, to one of the cheeks of the casing 1, and eccentric relative to the shafts 3 and 6. The drum 12 is hollow and the driven shaft 6 and the driving pinion 4 revolve in the bore thereof. Moreover, the end of said drum is formed as a bearing 14 resting directly on the shaft 6, so that said drum is rigidly supported at both ends. The drum 12 supports a sliding gear 15 loosely mounted thereon but which can be shifted longitudinally in a manner presently to be described, so as to bring it into predetermined positions. Said sliding gear 15 has an internal toothing 16 constantly gearing with the external toothing of the driving pinion 4. This condition will be observed provided that the eccentricity of the drum 12 is equal to that of the two internal and external toothings 16 and 4 which have to mesh. Furthermore the drum 12 must be cut away at 12ª. Moreover, at the other end of the sliding gear 15 is formed an external toothing 17 adapted to engage with the internal toothing 18 formed in a plate 19 keyed to the driven shaft 6.

Figure 2:
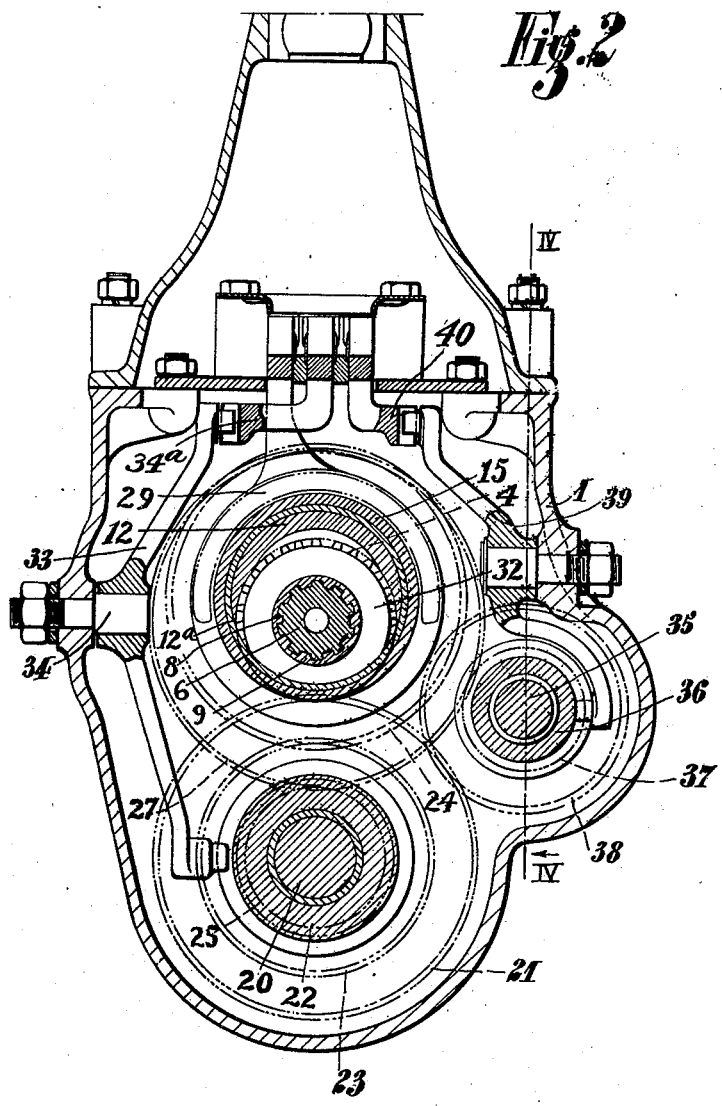
Fig. 2 is a corresponding cross-section on the line II—II of Fig. 1.

The gear box likewise includes a countershaft 20 located parallel to the shafts 3 and 6 and supported at both ends by the side cheeks of the casing 1. On said shaft 20 is mounted a pinion 21 constantly engaging with the driving pinion 4, owing to the provision of the cutaway portion 12ª which is more clearly to be seen in Figs. 2 and 3. On the countershaft 20 is likewise loosely mounted a second sliding gear 22 including an externally toothed pinion 23 which can engage with an external toothing 24 on the first sliding gear 15. Said second sliding gear likewise includes a second external pinion 25 having a central neutral portion 26 and which can cooperate with an external toothing 27 formed on the plate 19 which is secured to the shaft 6. The second sliding gear 22 may be coupled to the pinion 21 by the clutch device 28 (dogs or ordinary teeth). In the case illustrated, it has been assumed that the pinion 21 is keyed to the shaft 20 whereby the latter is constantly rotated so that it may be used as desired, for example for driving some particular member.

Obviously, however, the gear box would operate in identical manner if the pinion 21 were loosely mounted on the shaft 20, in which case the latter might be held stationary.

A system of levers of a conventional type has been illustrated in the accompanying drawings for controlling the longitudinal displacement of the sliding gears 15 and 22. In the case in point, the displacement of the first sliding gear 15 may be controlled by a fork 29 actuated by the usual gear lever 30. According to the invention, the internal sleeve 9 is displaced by the same fork 29 through the medium of the first sliding gear 15. To this end, the latter has an internal annular groove 31 in which engages a collar 32 carried by the sleeve 9. The sleeve 9 thus follows every displacement of the sliding gear 15 which thus, in addition to acting as a sliding gear, likewise acts as a controlling member for the sleeve 9. As for the displacement of the second sliding gear 22, it is controlled by a lever 33 (Fig. 2) pivotally mounted at 34 and controlled at its upper end by a slide-block 34ª actuated by the lever 30.

The above described gear box operates in the following manner:

To obtain direct drive, it is only necessary to displace the sliding gear 15 by moving the lever 30 so as to bring said sliding gear into its right end position. Such displacement produces displacement to the right of the sleeve 9, the toothing 10 of which engages in the corresponding toothing 11 of the pinion 4. The driving shaft 3 and the driven shaft 6 are thus made to rotate as a whole; the sliding gear 15 and the pinion 21 rotate idly.

For the third speed, the sliding gear 15 is shifted to the left so as to cause the external toothing 17 thereof to gear with the internal toothing 18 of the plate 19. The drive is then transmitted by the driving pinion 4, the internal toothing 16, the sliding gear 15, the external toothing 17, the internal toothing 18 and the plate 19. The pinion 21 rotates idly as far as the gear changes are concerned.

For second speed, the sliding gear 15 is left in the neutral position (position illustrated in Fig. 1) and the lower sliding gear 22 is shifted to the left so as to cause the pinion 23 to engage with the external toothing 24 of the sliding gear 15 and the pinion 25 (through its right toothing) to engage with the external toothing 27 of the plate 19. The drive is then transmitted by the pinion 4, the internal toothing 16, the sliding gear 15, the external toothing 24, the pinion 23; the sliding gear 22, the pinion 25 and the toothing 27; the pinion 21 is again rotated but transmits no power.

Finally, for first speed, the sliding gear 15 is again left in neutral position and the lower sliding gear 22 is shifted to the right so as to cause the toothing 28 of the sliding gear 22 to engage with the pinion 21. The effect of such displacement is simultaneously to bring the pinion 25 (through its left toothing) into gear with the toothing 27 of the plate 19. The drive is then transmitted by the driving pinion 4, the pinion 21, the sliding gear 22, the pinion 25, the external toothing 27 and the plate 19. The sliding gear 15 rotates idly.

Thus, the gear box according to the invention allows direct drive and three other speeds to be obtained, one of these speeds, the third in the example described, being obtained to a great extent by means of internally toothed gears. The gear box is of very sturdy and compact design owing to the provision of the eccentric drum 12 supporting the sliding gear 15.

Naturally said gear box can include a device enabling reverse speed to be obtained. For this purpose, it is only necessary to provide, as illustrated, a second countershaft 35 parallel to the aforementioned shafts, and on which a sliding gear 36 including pinions 37 and 38 rotates loosely. When the sliding gear 36 is shifted to the right (for example by the lever 39 controlled by the slide-block 40 and the lever 30) the pinion 38 is brought into gear with the pinion 11 and the pinion 37 with the external toothing 27 of the plate 19. The direction of rotation of the driven shaft 6 is reversed relative to that of the driving shaft 3. In this instance, the two sliding gears 15 and 22 rotate loosely without transmitting drive.

It will be observed that the invention is not specially applicable to gear boxes affording a direct drive, three other speeds and reverse; on the contrary, its application may be extended to all gear boxes preferably provided with a double set of internally toothed gears for obtaining one of the speeds.

It is moreover self evident that the invention has only been described and illustrated here in a purely explanatory but by no means limitative manner and that it could be subjected to modifications in detail without departing from the spirit thereof.

I claim:

1. In a change-speed gear, the combination of a driving shaft, a driven shaft, a fixed hollow drum disposed eccentrically about said driving and driven shafts, a sliding gear surrounding said fixed drum and continuously rotated by said driving shaft, and coupling means between said sliding gear and said driven shaft engageable with and disengageable from said sliding gear.

2. In a change-speed gear, the combination of a driving shaft, a driven shaft, in alignment with said driving shaft, a fixed hollow drum disposed eccentrically about said driving and driven shafts, a sliding gear surrounding and carried by said fixed drum, means through which said driving shaft continuously rotates said sliding gear, and a plurality of means with which said sliding gear can be selectively engaged to transmit drive to said driven shaft.

3. In a change-speed gear, the combination of a driving shaft, a driven shaft, a fixed hollow drum disposed eccentrically about said driving and driven shafts and supported at one end by said driven shaft, a casing enclosing said drum and shafts and supporting the other end of said drum, a sliding gear slidably mounted on said drum, means through which said driving shaft continuously rotates said sliding gear, and a plurality of means with which said sliding gear can be selectively engaged to transmit drive to said driven shaft.

4. In a change-speed gear, the combination of a driving shaft, a driven shaft in alignment with said driving shaft and journalled in a bore thereof, a fixed hollow drum disposed eccentrically about said driving and driven shafts and supported at one end by said driven shaft, a casing enclosing said drum and shafts and supporting the other end of said drum, a sliding gear carried by said drum and continuously rotated by said driving shaft, and a plurality of means with which said sliding gear can be selectively engaged to transmit drive to said driven shaft.

5. In a change-speed gear, the combination of a driving shaft, a driven shaft, a fixed hollow drum disposed eccentrically about said driving and driven shafts, a driving pinion fast on said driving shaft, a sliding gear mounted on said fixed drum and including an internally toothed portion, said fixed drum having a cut-away portion whereby said internally toothed portion of said sliding gear can gear with said driving pinion, and a plurality of means with which said sliding gear can be selectively engaged to transmit drive to said driven shaft.

6. In a change-speed gear, the combination of a driving shaft, a driven shaft in alignment with said driving shaft, a fixed hollow drum disposed eccentrically about said driving and driven shafts, a driving pinion fast on said driving shaft, a sliding gear mounted on said fixed drum and including an internally toothed portion, said fixed drum having a cut-away portion whereby said internally toothed portion of said sliding gear can gear with said driving pinion, a toothed member fast on said driven shaft, and a toothing on said sliding gear adapted to be brought into and out of engagement with said toothed member by shifting said sliding gear along said drum.

7. In a change-speed gear, the combination of a driving shaft, a driven shaft, a fixed hollow drum disposed eccentrically about said driving and driven shafts, and supported at one end by said driven shaft, a casing enclosing said drum and shafts and supporting the other end of said drum, a driving pinion fast on said driving shaft, a sliding gear mounted on said fixed drum and including an internally toothed portion, said fixed drum having a cut-away portion whereby said internally toothed portion of said sliding gear can gear with said driving pinion, an internally toothed member fast on said driven shaft, and an external toothing on said sliding gear adapted to be brought into and out of engagement with said internally toothed member by shifting said sliding gear along said drum.

8. In a change-speed gear, the combination of a driving shaft, a driven shaft, a fixed hollow drum disposed eccentrically about said driving and driven shafts, an internally and externally toothed driving pinion fast on said driving shaft, a sliding gear mounted on said fixed drum, a sleeve feather-keyed to said driven shaft and displaceable with said sliding gear, a clutch member integral with said sleeve and adapted to engage with the internal toothing of said driving pinion upon displacement of said sleeve whereby said driving and driven shafts are directly connected together, an internal toothing on said sliding gear adapted to engage continuously with the external toothing of said driving pinion, an internally and externally toothed plate fast on said driven shaft, an external toothing on said sliding gear adapted to be brought into and out of engagement with the internal toothing of said plate by shifting said sliding gear along said drum, a countershaft running parallel to said driving and driven shafts but located outside said drum, means whereby the countershaft is continuously driven from the driving shaft and a sliding gear sliding on said countershaft and adapted to be brought into engagement with the external toothing on said plate and said first sliding gear.

9. In a change-speed gear, the combination of a driving shaft, a driven shaft, a fixed hollow drum disposed eccentrically about said driving and driven shafts, and supported at one end by said driven shaft, a casing enclosing said drum and shafts and supporting the other end of said drum, an internally and externally toothed driving pinion fast on said driving shaft, a sliding gear mounted on said fixed drum and including an internally toothed portion, said fixed drum having a cut-away portion whereby said internally toothed portion of said sliding gear can gear with said driving pinion, a sleeve featherkeyed to said driven shaft and displaceable with said sliding gear, a clutch member integral with said sleeve and adapted to engage with said driving pinion upon displacement of said sleeve whereby said driving and driven shafts are directly connected together, an internal toothing on said sliding gear adapted to engage continuously with the external toothing of said driving pinion, an internally and externally toothed plate fast on said driven shaft, an external toothing on said sliding gear adapted to be brought into and out of engagement with the internal toothing of said plate by shifting said sliding gear along said drum, a countershaft running parallel to said driving and driven shafts outside said drum, a sliding gear displaceable along said countershaft and adapted to be brought into engagement with said first sliding gear and the external toothing on said plate, coupling means for continuously rotating said countershaft from said driving shaft, and a second set of gears on said countershaft sliding gear adapted on predetermined displacement of said second sliding gear to couple said countershaft to said driven shaft through said toothed plate.

10. In a change-speed gear box, the combination of a driving shaft, a driven shaft in alignment with said driving shaft and journalled in a bore thereof, a driving pinion fast on said driving shaft, a plate fast on said driven shaft and including an internally and an externally toothed portion, a fixed hollow drum disposed eccentrically about said driving and driven shafts, a sliding gear mounted on said fixed drum and including an internally toothed portion constantly gearing with said driving pinion and an externally toothed portion capable of engaging with the internally toothed portion of said plate, a sleeve slidably mounted on said driven shaft and adapted to couple together said driving and driven shafts, a countershaft running parallel to said driving and driven shafts, a pinion mounted on said countershaft and constantly gearing with said driving pinion a second external toothing on said sliding gear, a second sliding gear mounted on said countershaft and including two spur wheels adapted to gear respectively with said external toothing on said plate and said second external toothing on said first sliding gear, and selector means for shifting said sleeve and sliding gears.

ROBERT EMILE CHARLES DELEVOYE.